April 22, 1969 O. B. CECIL 3,440,372

ALUMINUM OXIDE HUMIDITY SENSOR

Filed March 31, 1966

INVENTOR
OLIN B. CECIL

E. Mickey Hubbard
ATTORNEY

United States Patent Office 3,440,372 Patented Apr. 22, 1969

3,440,372

ALUMINUM OXIDE HUMIDITY SENSOR

Olin B. Cecil, Richardson, Tex., assignor to Texas Instruments Incorporated, Dallas, Tex., a corporation of Delaware Filed Mar. 31, 1966, Ser. No. 539,134
Int. Cl. H01h *29/00;* H01c *13/00*
U.S. Cl. 200—61.04 2 Claims This invention relates generally to humidity sensors, and more particularly relates to an improved aluminum oxide humdity sensor and measuring system using D.C. measurements.

A number of different aluminum oxide humidity sensors are presently known in the art and are in use. These sensors are usually fabricated by anodizing an aluminum rod in a suitable electrolyte, such as sulfuric acid, oxalic acid or chromic acid. These electrolytes first produce a dense nonporous layer directly on the surface of the aluminum, and then a porous layer on the dense layer. A thin metallized film, such as aluminum, is evaporated over the surface of the porous oxide layer to form an electrode that is pervious to water vapor. The aluminum rod or sheet serves as the other electrode. The porous aluminum oxide layer absorbs water vapor until an equilibrium is established between the ambient atmosphere and the walls of the pores in the oxide film. As the relative humidity increases, more water vapor is absorbed by the porous aluminum oxide layer, resulting in a decrease in the series resistance between the electrodes as well as an apparent increase in the capacitance between the electrodes. However, since the dense, nonporous aluminum oxide layer does not absorb water vapor, its electrical properties do not change. The nonporous layer constitutes a significant series resistance as compared to that of the moisture laden porous layer so that the humidity cannot be measured simply by measuring changes in the resistance of the two aluminum oxide layers. Instead, the relative humidity must be measured by measuring the overall impedance of the sensor using A.C. techniques. This complicates the electrical measurements and the equipment required. Also, the nonporous layer of aluminum oxide constitutes a significant portion of the overall impedance of the sensor so that the sensitivity of the sensor is reduced.

An important object of this invention is ot provide a more accurate humidity sensor.

Another important object of the invention is to provide a humidity sensor wherein the resistance of the sensor is an accurate measure of the humidity and which can, therefore, be used in combination with simple D.C. resistance measuring circuit means.

Another important object of the invention is to provide a process for fabricating such a humidity sensor.

In accordance with this invention, the humidity sensor is comprised of a single layer of porous aluminum oxide having a metallized electrode formed on each face thereof, at least one of the electrodes being porous to permit water vapor to pass between the ambient and the porous aluminum oxide layer. The equivalent circuit of the device is then a resistance and a capacitance in parallel, and variations in the value of each are almost entirely the result of changes in the relative humidity of the atmosphere around the sensor. Thus, the resistance and therefore the humidity can be made using a relatively simple D.C. circuit.

In accordance with another aspect of the invention, the sensor is fabricated by first anodizing an aluminum body, preferably having a generally flat face, to form both a layer of dense nonporous aluminum oxide and a layer of porous aluminum oxide. Then the porous aluminum oxide is stripped from the layer of dense nonporous aluminum oxide and electrodes formed on the opposite faces of the layer of porous aluminum oxide, at least one of the electrodes being pervious to water vapor.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1:
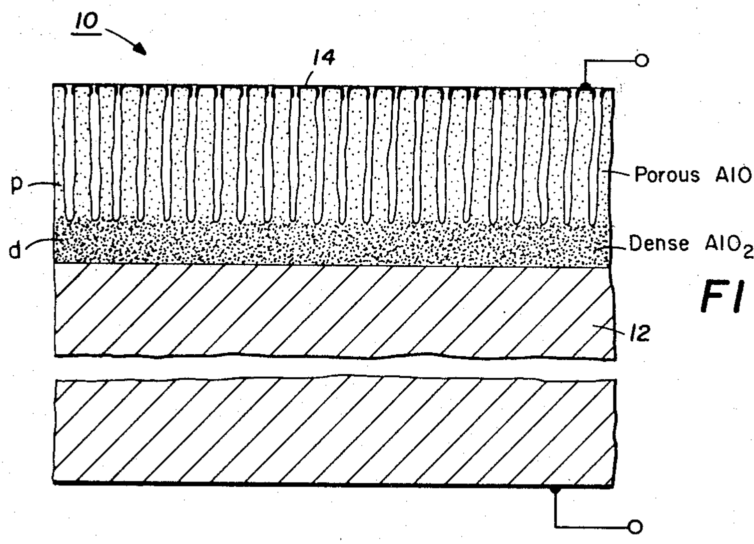
FIGURE 1 is a somewhat schematic cross-sectional view of a typical prior art aluminum oxide humidity sensor.

Referring now to the drawings, a typical prior art humidity sensor is indicated generally by the reference numeral 10. The sensor 10 is comprised of an aluminum body 12, which may be either a rod or a sheet, the surface of which has been anodized to produce a dense aluminum oxide layer *d* directly on the surface of the aluminum body 12, and a substantially thicker porous aluminum oxide layer *p* on the dense layer *d* and extending over the electrode 12. A porous, electrically conductive electrode 14 is formed over the surface of the porous aluminum oxide layer *p* by vacuum evaporating and depositing a thin layer of aluminum or other suitable conductive material. The porous aluminum oxide layer *p* has an affinity for moisture and absorbs moisture from the surrounding ambient until an equilibrium condition is reached. As the relative humidity of the ambient changes, the moisture content of the porous layer *p* will also change in order to maintain equilibrium.

Figure 2:
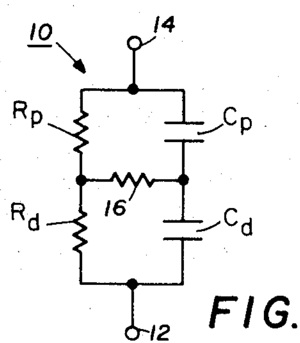
FIGURE 2 is an equivalent schematic circuit diagram of the sensor of FIGURE 1.

The equivalent electrical circuit of the sensor 10 is illustrated in FIGURE 2. The porous layer *p* may be represented as a resistor $R_p$ and a capacitance $C_p$ connected in parallel. The dense layer *d* may be represented by resistor $R_d$ and capacitance $C_d$, which are also connected in parallel. The parallel resistance and capacitance of the porous layer *p* is then connected in series with the resistance and capacitance of the dense layer *d*. The transverse resistance at the interface between the dense and porous layers *d* and *p* may be lumped and represented by a single resistor 16. In order to measure relative humidity with the sensor 10, it is necessary to measure the overall impedance of the sensor using A.C. techniques because the changes in the resistance $R_p$ are so small with relation to the value of the resistance $R_d$ that meaningful measurements cannot be obtained using D.C. techniques. Since changes in the moisture content of the porous aluminum oxide layer *p* change both the resistance $R_p$ and the capacitance $C_p$, while the resistance $R_d$ and capacitance $C_d$ of the dense layer do not change, calibration of the impedance measurements in terms of relative humidity is somewhat difficult, and the calibration tends to change markedly for a period of several months as a result of aging.

Figure 3:
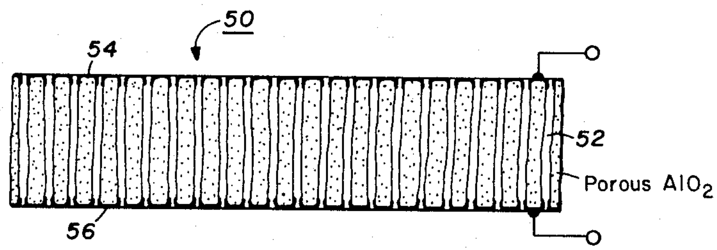
FIGURE 3 is a somewhat schematic cross-sectional view of a humidity sensor constructed in accordance with the present invention.

A humidity sensor fabricated in accordance with the present invention is indicated generally by the reference numeral 50 in FIGURE 3. The sensor 50 is comprised of a single porous layer of aluminum oxide 52, and electrically conductive electrode films 54 and 56, at least one of which is porous and thereby pervious to moisture from the atmosphere. Both of the electrodes 54 and 56 may be pervious if desired, or one may be a solid metallic sheet to provide physical support for the layer 52.

Figure 4:
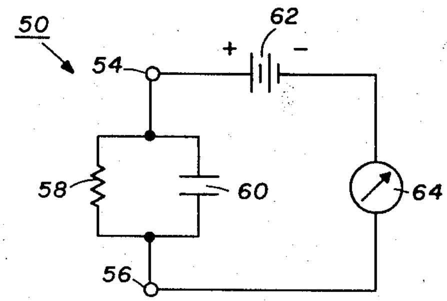
FIGURE 4 is a schematic equivalent circuit diagram of the sensor of FIGURE 3.

The equivalent electrical circuit of the sensor 50 is illustrated in FIGURE 4 and is comprised merely of a resistor 58 and a capacitor 60 in parallel. Since the value of the resistance 58 is determined by the moisture content of the porous aluminum oxide layer 52, it will be evident that relative humidity can be measured using the sensor 50 by simple D.C. techniques, such as by a voltage source 62 and a simple amp meter 64. Or if desired, the D.C. voltage drop across the sensor 50 could be measured and calibrated to indicate humidity.

In accordance with another aspect of the invention, the humidity sensor 50 is fabricated by anodizing an aluminum body, preferably having a flat face. For example, aluminum foil may be used for this purpose. The aluminum foil is anodized using a suitable conventional electrolyte, such as sulfuric acid, oxalic acid, or chromic acid, which it will be noted are the same electrolytes which may be used to fabricate the prior art sensor 10. These electrolytes form a relatively thin dense aluminum oxide layer, such as layer *d* in FIGURE 1, overlain by a relatively thick porous aluminum oxide layer, such as layer *p* in FIGURE 1.

Next the porous aluminum oxide layer is separated from the dense aluminum oxide layer and the aluminum foil using any one of several known chemical stripping processes such as those described starting on page 196 of Anodic Oxide Films by L. Young (1961), published by the Academic Press, New York. For example, the metal foil may be cut into squares so as to expose the edges of the three layers and immersed in a mercurous chloride ($HgCl_2$) solution until amalgamation starts. Then the squares are placed in distilled water and after a time the porous oxide layer becomes completely detached from the dense oxide layer and from the metal foil. Or, the metal layer and dense layer may be dissolved in bromine or iodine dissolved in methyl alcohol, or dissolved in oxygen-free hydrochloric acid dissolved in absolute ether, or a mixture of hydrofluoric acid and nitric acid.

After the porous aluminum oxide layer has been separated from the dense layer, at least one surface of the porous aluminum oxide body is metallized to form a porous electrode. This may be accomplished by evaporating and depositing a thin layer of aluminum, or other suitable metal, on the surface, the film being thin enough to permit moisture to pass through the electrode into the porous aluminum oxide layer. If desired, the other surface may also be covered by a porous electrode, or may be covered by a nonporous electrode having a sufficient thickness to lend structural rigidity to the sensor.

From the above detailed description of preferred embodiments of the invention, it will be appreciated that an improved humidity sensor has been described. Since the moisture content of the entire bulk of the sensor varies with the moisture content of the ambient atmosphere, the resistance can be effectively measured using D.C. measurement techniques and the measurements easily calibrated in terms of relative humidity. Since the entire bulk of the sensor changes with humidity, the resistance measurements are more accurate than heretofore attainable. A novel process for fabricating the sensor has also been described.

Although preferred embodiments of the invention have been described in detail, it is to be understood that various changes, substitutions and alterations can be made therein without departing from the spirit and scope of the invention as defined by the appended claims.

What is claimed is:

1. A humidity sensor comprising a body of porous aluminum oxide having conductive electrodes on opposing faces thereof, at least one of the electrodes being pervious to water vapor whereby equilibrium can be maintained between water in the pores of the body of porous aluminum oxide and water in the atmosphere around the sensor.

2. In a system for measuring relative humidity, the combination of:

a sensor comprising a body of porous aluminum oxide having conductive electrodes on opposing faces thereof at least one of which is pervious to water, and direct current measuring means connected to the electrodes for passing a direct current through the sensor and measuring the resistance of the sensor as a measure of the relative humidity of the atmosphere around the sensor.

References Cited

UNITED STATES PATENTS

| | | | |
|---|---|---|---|
| 2,237,006 | 4/1941 | Koller | 338—35 |
| 3,045,198 | 7/1962 | Dolan et al. | 338—35 |
| 3,077,784 | 2/1963 | McIlvaine | 338—35 |
| 3,255,324 | 6/1966 | Oushinsky | 200—61.04 |
| 3,356,979 | 12/1967 | Bouyoucos | 338—35 |

ROBERT K. SCHAEFER, *Primary Examiner.*

H. O. JONES, *Assistant Examiner.*

U.S. Cl. X.R.

338—35